United States Patent
McGurk et al.

(10) Patent No.: US 9,234,802 B2
(45) Date of Patent: Jan. 12, 2016

(54) ENERGY OUTPUT MEASURING DEVICE FOR INFRARED HEATING DEVICE

(71) Applicant: Plastic Technologies, Inc., Holland, OH (US)

(72) Inventors: Jonathan Alan McGurk, Toledo, OH (US); Aaron Raphael Teitlebaum, Holland, OH (US)

(73) Assignee: Plastic Technologies, Inc., Holland, OH (US)

( * ) Notice: Subject to any disclaimer, the term of this patent is extended or adjusted under 35 U.S.C. 154(b) by 356 days.

(21) Appl. No.: 13/769,522

(22) Filed: Feb. 18, 2013

(65) Prior Publication Data

US 2014/0138524 A1    May 22, 2014

Related U.S. Application Data

(60) Provisional application No. 61/728,892, filed on Nov. 21, 2012.

(51) Int. Cl.
*G01J 5/00* (2006.01)

(52) U.S. Cl.
CPC ..................... *G01J 5/0044* (2013.01)

(58) Field of Classification Search
CPC .................................. H01J 40/14; H01J 5/02
USPC ......................................................... 250/239
See application file for complete search history.

(56) References Cited

U.S. PATENT DOCUMENTS

| | | | |
|---|---|---|---|
| 3,865,912 A | 2/1975 | Rosenkranz et al. | |
| 4,079,104 A | 3/1978 | Dickson et al. | |
| 4,606,723 A | 8/1986 | Pasternicki | |
| 5,032,700 A | 7/1991 | Sugiyama et al. | |
| 5,322,651 A | 6/1994 | Emmer | |
| 5,591,462 A * | 1/1997 | Darling et al. | 425/173 |
| 5,869,110 A | 2/1999 | Ogihara | |
| 6,099,766 A | 8/2000 | Aoki et al. | |
| 6,432,651 B1 | 8/2002 | Hughes et al. | |
| 6,836,860 B2 * | 12/2004 | Muttik et al. | 714/38.14 |
| 7,372,060 B2 * | 5/2008 | Barnes et al. | 250/506.1 |
| 7,491,358 B2 | 2/2009 | Gernhuber et al. | |
| 2011/0062611 A1 | 3/2011 | Menary et al. | |
| 2011/0291332 A1 | 12/2011 | Voth et al. | |
| 2011/0299086 A1 | 12/2011 | Voth et al. | |

FOREIGN PATENT DOCUMENTS

| | | |
|---|---|---|
| EP | 1342550 A1 | 9/2003 |
| JP | 60-034827 | 2/1985 |
| WO | 02087850 A1 | 11/2002 |
| WO | 2005067591 A2 | 7/2005 |

* cited by examiner

*Primary Examiner* — Seung C Sohn
(74) *Attorney, Agent, or Firm* — Fraser Clemens Martin & Miller LLC; Michael E. Dockins

(57) ABSTRACT

An energy output measuring device including a main body having a light reflecting exterior and a window portion formed in the main body and produced from infrared-reflecting glass. At least one visible light sensor is disposed adjacent the window. The energy output measuring device is configured to pass through a heating device. An energy output of the heating device is determined from measurements taken by the heating device.

20 Claims, 4 Drawing Sheets

ENERGY OUTPUT MEASURING DEVICE FOR INFRARED HEATING DEVICE

CROSS-REFERENCE TO RELATED APPLICATION

This application claims the benefit of priority of U.S. Provisional Patent Application Ser. No. 61/728,892 filed on Nov. 21, 2012 hereby incorporated herein by reference in its entirety.

FIELD OF THE INVENTION

The invention relates to a device for measuring energy output, and more particularly to a device for measuring the energy output of an oven used for a blow molding process.

BACKGROUND OF THE INVENTION

Blow-molded plastic containers are commonly used for storing various products. In order to produce blow-molded plastic containers, blow molding ovens are used to heat preforms and condition the preforms for subsequent blow molding. Blow molding ovens typically include heating elements that are disposed within the oven. The heating elements are arranged to form a path by which the preform passes. The heating elements are typically arranged side-by-side and stacked one atop another to ensure that an entire length of the preform is heated. As preforms travel along the path formed by the heating elements, the desired portions of the preforms are heated.

Heating elements such as lamps, for example, are operated at temperatures where the heating elements emit energy which is characterized within the visible and invisible spectrum during the blow molding process. It is well known that sensors may be used to measure the overall intensity of energy emitted from such lamps. However, within the context of blow molding ovens and the preform heating process, technology relating to the measurement of the energy emitted from the heating elements is lacking. Over time, blow molding ovens and corresponding heating elements lose efficiency, and there is a need to quantify oven wear and aging and, more specifically, the loss of efficiency of the heating elements within blow molding ovens in order to optimize the blow molding process overall.

It would be desirable to have an energy output measuring device configured to travel through an oven to collect information relating to the oven age, wear, efficiency, energy output, and other important parameters related to the oven performance.

SUMMARY OF THE INVENTION

Concordant and congruous with with the present invention, an energy output measuring device configured to travel through an oven to collect information relating to the oven age, wear, efficiency, energy output, and other important parameters related to the oven performance, has surprisingly been discovered.

In an embodiment of the invention, an energy output measuring device comprises a main body adapted to cooperate with a spindle of a blow molding machine; at least one light sensor disposed in the main body; and a window disposed in the main body adjacent the sensor.

In another embodiment of the invention, an energy output measuring device comprises a main body having a light-reflective exterior adapted to cooperate with a spindle of a blow molding machine; at least one visible light sensor disposed in the main body; and a window formed from an infrared-reflective material disposed in the main body adjacent the sensor.

In another embodiment of the invention, a method for measuring the energy output of an infrared heating device comprises the steps of providing an energy output measuring device having a sensor disposed on a spindle of a blow molding machine; passing the energy output measuring device through a heating device of the blow molding machine; measuring at least one wavelength of light emitted from the heating device; and calculating the temperature of the heating device using the measured wavelength(s) of light.

BRIEF DESCRIPTION OF THE DRAWINGS

The above, as well as other advantages of the present invention, will become readily apparent to those skilled in the art from the following detailed description when considered in the light of the accompanying drawings, in which.

DETAILED DESCRIPTION OF AN EMBODIMENT OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
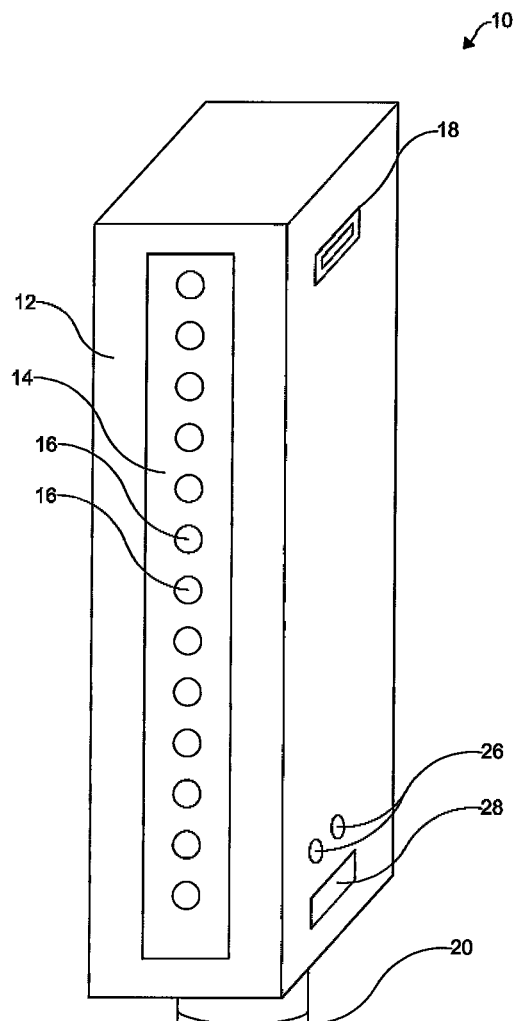
FIG. 1 is a front perspective view of an energy output measuring device according to an embodiment of the present disclosure.
Figure 3:
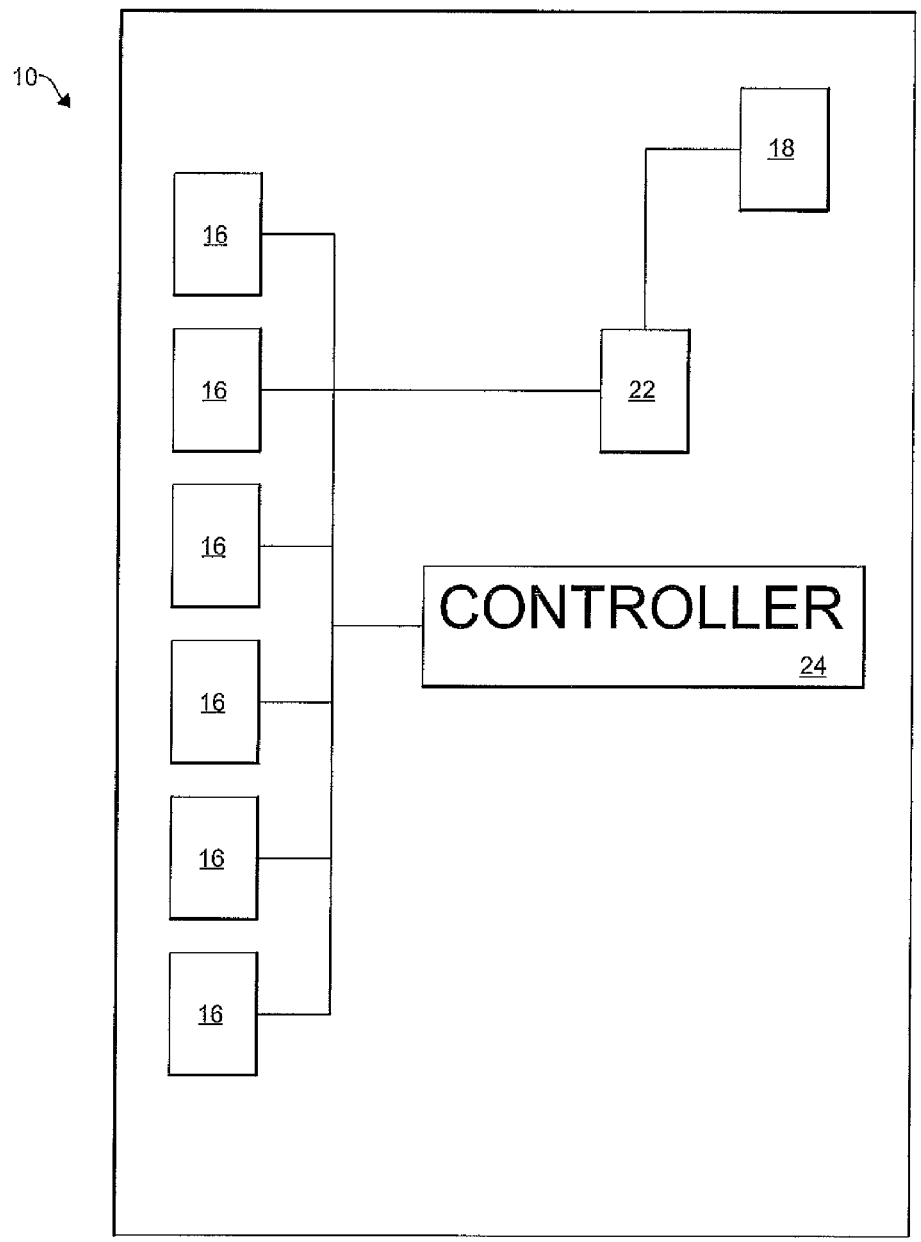
FIG. 3 is a schematic diagram of the energy output measuring device of FIG. 1.

Referring to FIGS. 1 and 3, there is illustrated an energy output measuring device, generally indicated by reference numeral 10. The device 10 includes a main body 12, a window 14, and a plurality of sensors 16. The energy output measuring device 10 may be used in various heating devices and appliances such as blow molding ovens, for example, and may be used to collect data relating to an energy output or a visible light output of heating elements included in the heating devices.

Figure 2:
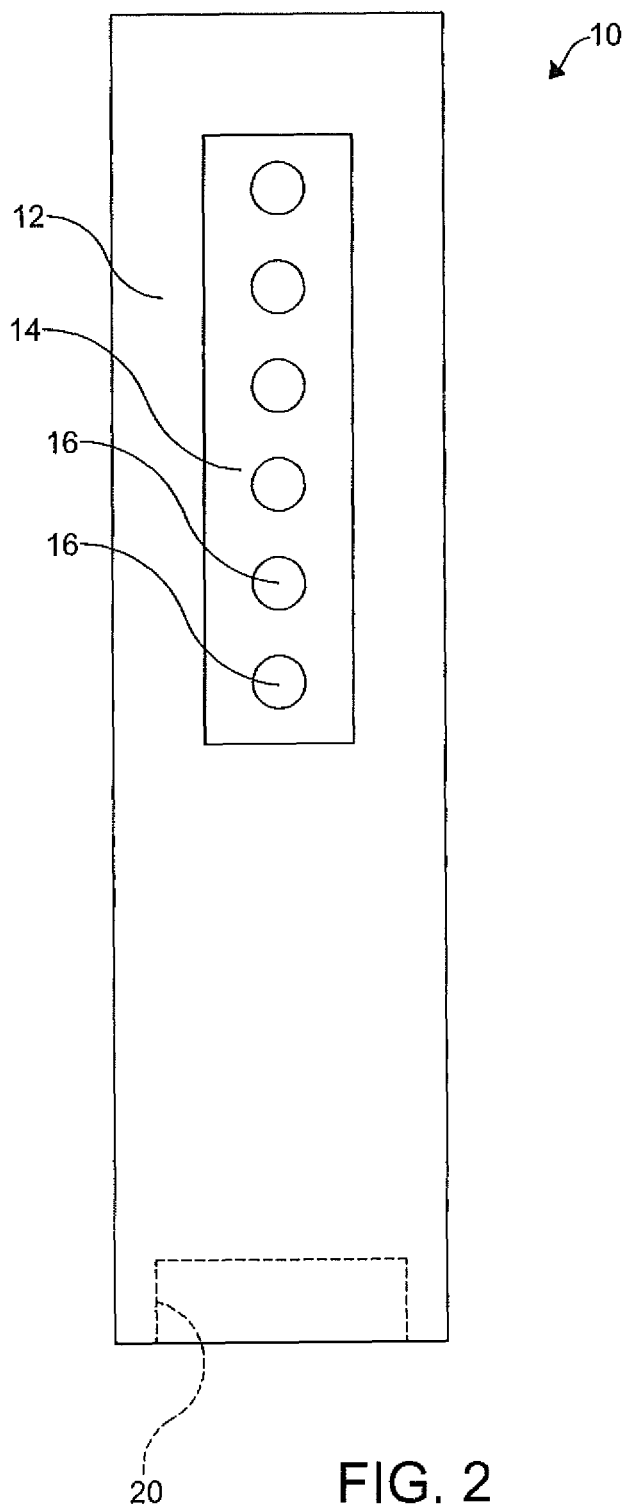
FIG. 2 is a front elevational view of an energy output measuring device according to another embodiment of the disclosure.
Figure 4:
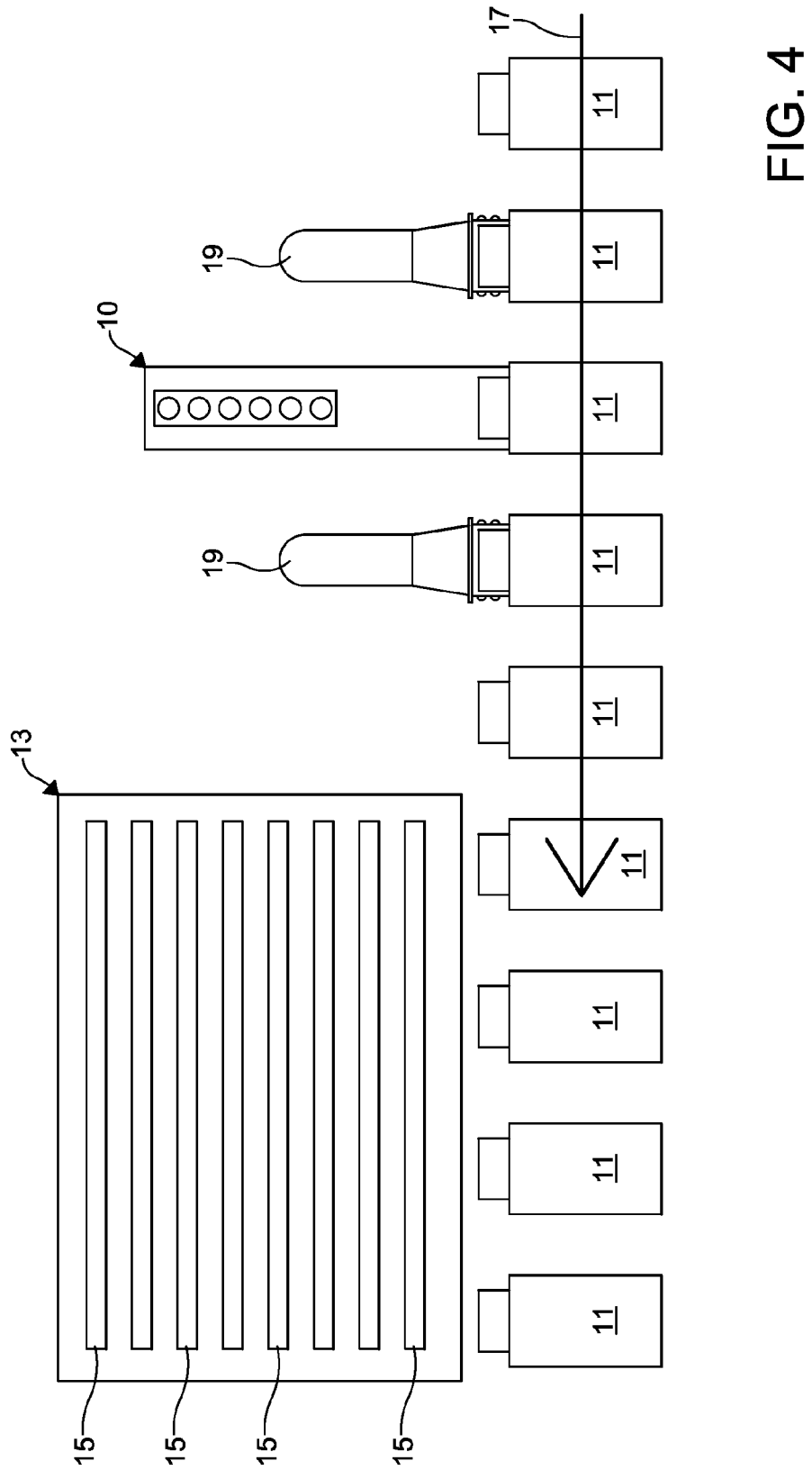
FIG. 4 is a diagram of the device of FIG. 2 deposited on a spindle as it passes a heating device.

As shown, the main body 12 of the energy output measuring device 10 is an elongate device but may be any desirable shape and size for traveling along a path within a heating device, such as an oven. The body 12 is formed from a polished material adapted to reflect light therefrom or has a light reflecting coating disposed on an exterior thereof. The material from which the body 12 is formed may have heat-resistant properties, or the body 12 may be insulated to militate against components therein being damaged by heat produced by the heating device 13. The size and shape of the main body 12 is configured to receive the plurality of sensors 16. An end of the body 12 of the energy output measuring device 10 includes a receiver 20 adapted to receive a spindle 11 of the heating device 13. The spindles 11 and the heating device are best shown in FIG. 4. As shown in FIG. 1, the receiver 20 protrudes from an end of the main body and has a substantially annular ring shape with a void therein to receive at least a portion of the spindle 11. It is understood that the energy output measuring device 10 may include only one sensor 16, as desired. As shown in FIG. 2, the receiver 20 is a cavity formed in an end of the device 10.

The body 12 also houses electrical components, such as a memory 22 for receiving and storing data, a controller 24 in communication with and for operating the plurality of sensors 16 and in communication with the memory 22, a data port 18 (such as a USB port, mini-USB port, an SD card reader, and the like) providing wired communication between the memory 22 and an external computing device, and other electrical components. The electrical components may be in electrical communication with a digital display or panel (not shown) provided on an outer surface of the device 10, external lights to indicate power on/off or functionality mode 26, or an on/off switch 28. The electrical components may be controlled by a remote control (not shown). The electrical components may direct the device 10 with regard to when the sensors 16 are measuring the energy output. Additionally, the electrical components may be used to identify where the device 10 is located along the path of travel within the heating device. Typically, the electrical components are disposed within the device 10 and are heat resistant in order to withstand the heat produced by the heating device 13. The memory 22 may be formed as part of the sensors 16, or may be a separate component that receives data from the sensors 16. The memory 22 may be in wireless communication with a computer or other external computing device for storage and manipulation of data received from the visible light sensor 16, or the memory 22 may be accessed using the data port 18.

The window 14 is formed from a heat resistant material through which visible light may pass. For example, the window 14 may be formed from extended range infrared-reflecting glass. The window 14 is typically disposed on a portion of the device 10 that directly faces the heating elements 15 as the device 10 travels along the path of travel 17 within the heating device 13. The size and shape of the window 14 may vary according to the device 10 and the heating device 13 through which the device 10 is traveling. For example, as shown in FIG. 1, the window 14 may be elongated and span nearly the entire length of the device 10, or, as shown in FIG. 2, the window may extend along only a portion of the device 10. It is also understood that there may be a plurality of windows 14 included on the device 10.

The plurality of sensors 16 is disposed adjacent the window 14 within the body 12 of the device 10. The sensors 16 may be any type of sensor capable of measuring energy output from heating elements 15 as the device 10 travels through the heating device such as semiconductor color sensors, for example. In one embodiment of the disclosure, a vertical array of visible light sensors 16 extends along a length of the window 14. The sensors 16 are adapted to sense a characteristic of the light such as at least one wavelength thereof, and may be adapted to sense light in two or more wavelengths. The sensors 16 may also sense and/or measure a characteristic of the energy such as a color, a temperature, and an intensity of the light passing through the window 14 of the device 10. The sensors 16 may sense and measure only visible light, only infrared light, or both visible and infrared light, as desired, for example.

In use, the energy output measuring device 10 is disposed on the spindle 11 using the receiver 20 to receive the spindle 11 to stabilize the device 10, as best shown in FIG. 4. The device 10 is then passed through the heating device 13 along the path of travel 17 within the heating device 13 such as the path of travel of a preform 19 through an oven for heat treatment, for example. Alternatively, the device 10 may be directed along the path of travel 17 within the heating device 13 by the electrical components within the device 10. The heating elements 15 are operated to emit thermal energy. The thermal energy includes visible light energy and/or infrared light energy. As the device 10 travels through the heating device 13, light is sensed by the sensors 16 by passing through the window 14 of the device 10. Light that does not pass through the window 14 is reflected off of the main body 12. As noted hereinabove, the sensors 16 may detect and measure only visible light, only infrared light, or a combination of visible and infrared light. When only visible light is desired to be sensed and the window 14 is formed from an infrared-reflecting material, the infrared light is reflected therefrom. When the sensors 16 detect/measure light emitted from the heating device, such measurement data are captured. The data is transmitted to the memory 22. The data may include information relating to a characteristic of the light such as the color, the temperature, and/or the intensity of the light passing through the window 14 of the device 10, and data regarding the location from which it was received at various points along the path of travel of the device 10. The data may be further evaluated or manipulated in order to determine an efficiency of the heating device 13 and other performance parameters relating to the output of the heating device 13. To retrieve data from the memory 22, the data may be wirelessly communicated from the memory 22 of the device and to an external computing means. Alternatively, the data may be retrieved by removing the memory 22 from the device, or the memory 22 may be accessed using the data port 18.

Using data from the plurality of sensors 16 retrieved from the device 10, a user may evaluate, for example, the total energy received throughout the path of travel 17 within the heating device 13 or the energy received at various points along the path of travel 17 within the heating device 13. For example, if the sensors 16 detect at least two different wavelengths of light from each heating device 13, such as a wavelength in the blue region of the spectrum and a wavelength in the red region of the spectrum, "two-color pyrometry" may be performed. Two-color pyrometry makes use of the intensities of light of at least two different wavelengths by taking a ratio between the two and extrapolating the radiated spectral distribution of the heating device 13 to calculate the temperature thereof. A user may make such calculations on the external computing device, or the device 10 may include a CPU or other computing device within its interior programmed to make such calculations. If the device 10 includes a computing device, the data retrieved therefrom may already be in the form of temperature information. Using the data collected from the heating device 13, a user can determine how temperatures of discrete heating units in a heating device 13 are performing and how temperatures of discrete heating elements 15 in a heating device 13 may have changed over time. By determining the temperatures of the discrete heating elements 15, the performance of the blow molding process may be optimized. Similarly, a user can calculate changes in temperatures of heating elements 15 in a heating device 13 by comparing previously-calculated temperatures to more current calculations. If calculated temperatures are changing over time for processes conducted under the same conditions, it may be an indication that heating elements 15 are damaged, failing, or otherwise under-performing. By determining that a heating elements 15 is damaged, failing, or under-performing, such heating units can be replaced or repaired, and adjacent heating units to an under-performing heating unit may be adjusted to compensate for the under-performing heating elements 15 until it may be replaced or repaired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An energy output measuring device comprising:
 a main body adapted to cooperate with a spindle of a heating device;
 at least one light sensor for measuring an energy output of heating elements, the at least one light sensor disposed in the main body; and
 a window disposed in the main body adjacent the sensor.

2. The energy output measuring device of claim 1, wherein the main body includes a receiver for receiving at least a portion of the spindle.

3. The energy output measuring device of claim 2, wherein the receiver is aimed on an end of the main body.

4. The energy output measuring device of claim 2, wherein the receiver is a cavity formed in an end of the main body.

5. The energy output measuring device of claim 1, wherein the light sensor is adapted to sense at least one wavelength of light.

6. The energy output measuring device of claim 5, wherein the light sensor is adapted to sense at least one wavelength of visible light.

7. The energy output measuring device of claim 1, wherein the window is formed from infrared reflecting glass.

8. The energy output measuring device of claim 1, wherein the main body is insulated.

9. The energy output measuring device of claim 1, further comprising a memory device disposed in the main body in communication with the light sensor.

10. The energy output measuring device of claim 9, wherein the memory device is in wireless communication with an external computing device.

11. The energy output measuring device of claim 9, further comprising a controller disposed in the main body in communication with the light sensor and the memory device.

12. The energy output measuring device of claim 1, wherein the main body is formed from a light reflective material.

13. The energy output measuring device of claim 12, wherein the main body has a light reflective coating on an exterior thereof.

14. An energy output measuring device comprising:
 a main body having a light-reflective exterior adapted to cooperate with a spindle of a blow molding machine;
 at least one visible light sensor for measuring an energy output of heating elements of a heating device, the at least one visible light sensor disposed in the main body; and
 a window formed from an infrared-reflective material disposed in the main body adjacent the sensor.

15. The energy output measuring device of claim 14, wherein the main body includes a receiver for receiving at least a portion of the spindle.

16. The energy output measuring device of claim 15, wherein the receiver is one of an annular ring formed on an end of the main body and a cavity formed in an end of the main body.

17. The energy output measuring device of claim 14, wherein the visible light sensor is adapted to sense at least one wavelength of visible light.

18. The energy output measuring device of claim 1, further comprising a memory device in communication with the light sensor and a controller in communication with the light sensor and the memory, the memory device and the controller disposed within the main body.

19. A method for measuring the energy output of an infrared heating device comprising the steps of:
 disposing an energy output measuring device having a sensor on a spindle;
 passing the energy output measuring device through a heating device; and
 measuring at least one characteristic of light emitted from heating elements of the heating device with the sensor of the energy output measuring device.

20. The method of claim 19, further comprising a step of determining an efficiency of the heating device by comparing the measured characteristic of the heating device to a previously-measured characteristic of the heating device.

* * * * *